United States Patent [19]
Kojima et al.

[11] Patent Number: 5,364,253
[45] Date of Patent: Nov. 15, 1994

[54] MAGNETIC CIRCUIT COMPONENT MOLDING DEVICE

[75] Inventors: Kiyoshi Kojima, Ikoma; Kazuyoshi Amami, Minamikawachi; Hiroshi Ueda, Takarazuka; Shizuo Furuyama, Katano; Yoshihiro Hara, Kameoka; Kyoichi Hasegawa, Moriguchi; Tadashi Kawamata, Suita, all of Japan

[73] Assignee: Matsushita Electric Industrial Co., Ltd., Osaka, Japan

[21] Appl. No.: 62,956

[22] Filed: May 14, 1993

[30] Foreign Application Priority Data

May 14, 1992 [JP] Japan .................. 4-121605

[51] Int. Cl.⁵ .............................................. B22F 3/00
[52] U.S. Cl. ........................... 425/78; 425/111; 425/127; 425/128; 425/352; 425/412; 425/451.7; 425/451.9; 425/DIG. 33
[58] Field of Search ............... 425/78, 110, 111, 117, 425/127, 128, 193, 195, 352, 354, 356, 406, 412, 422, 451.7, 451.9 DK, 33

[56] References Cited

U.S. PATENT DOCUMENTS

| | | | |
|---|---|---|---|
| 3,149,374 | 9/1964 | Wagner | 425/352 |
| 3,307,221 | 3/1967 | Bolner | 425/352 |
| 3,387,323 | 6/1968 | Wyllie et al. | 425/451.7 |
| 3,557,408 | 1/1971 | Fischer et al. | 425/128 |
| 3,593,382 | 7/1971 | Miller | 425/78 |
| 3,797,979 | 3/1974 | Greenwood | 425/451.7 |
| 3,830,609 | 8/1974 | Heier | 425/128 |
| 4,362,490 | 12/1982 | Machida et al. | 425/128 |
| 4,666,389 | 5/1987 | Relis et al. | 425/78 |
| 5,135,382 | 8/1992 | Tsuchiya et al. | 425/451.7 |
| 5,238,640 | 8/1993 | Masui et al. | 425/128 |

FOREIGN PATENT DOCUMENTS

| | | | |
|---|---|---|---|
| 61-230309 | 10/1986 | Japan | 425/DIG. 33 |
| 4-115699 | 4/1992 | Japan . | |
| 850310 | 7/1981 | U.S.S.R. | 425/451.7 |

OTHER PUBLICATIONS

English Abstract of the above reference.

*Primary Examiner*—Charles S. Bushey
*Attorney, Agent, or Firm*—Ratner & Prestia

[57] ABSTRACT

A magnetic circuit component molding device for integrally molding a compound a center yoke with a ring-shaped magnet includes top and bottom press vertically arranged at opposed positions. A ring-shaped magnet is place on a bottom die between top and bottom press. The top and bottom press compress the compound against the ring-shaped magnet ring with a vertical pressure. A holder unit, separated in plural segments, having tapered outer circumferences is provided around the ring-shaped. A holder presser having a tapered inner circumference is mounted on the holder unit as tapered portions thereof are engaged together. A portion of the vertical pressure, when the top press compresses the compound, is transferred by springs 10 to the holder presser, and is amplified by the tapered portions and applied to the outer circumference surface of the ring-shaped magnet by the holder unit.

5 Claims, 5 Drawing Sheets

MAGNETIC CIRCUIT COMPONENT MOLDING DEVICE

BACKGROUND OF THE INVENTION

1. Field of the Invention

The present invention relates to a magnetic circuit component molding device for molding magnetic circuit components comprising a permanent magnet and magnetic yoke such as used in speakers and motors and, more particularly, to a device for integrally molding a center magnetic yoke within a ring-shaped magnet.

2. Description of the Prior Art

Magnetic circuit components using ring-shaped magnets are primarily used for rotors in electric motors. In most cases, these ring-shaped magnets consist of three to six curved magnet pieces that are applied to the magnetic yoke of the shaft using an adhesive.

That part of this magnetic circuit component that is inside the ring-shaped magnet and in contact with the inside circumference of the ring-shaped magnet molding and pass of the magnetic flux flowing out from the ring-shaped magnet is referred to below as the "center magnetic yoke." The magnetic yoke of the rotating shaft of an electric motor as referred to above is a type of center magnetic yoke.

Because of the way ring-shaped magnets are used, radially oriented magnets manufactured with easy magnetization axes oriented in the radial direction are used as ring-shaped sintered magnets. Barium ferrite magnets, however, tend to crack during sintering because of the difference in the thermal expansion coefficients in the orientation direction (radial) and the direction perpendicular thereto (circumference). It is difficult to manufacture radially oriented magnets without cracking, and crack-free radially oriented magnets are therefore rarely used. Some are used with knowledge of cracks, but in this case adhesive or some other means is used to securely fasten the magnets to the center magnetic yoke or other component.

Developed some years ago, neodymium-iron-boron magnets offer higher mechanical strength than the above barium ferrite magnets. This high mechanical strength prevents cracking caused by the internal stress created by thermal contraction differences during sintering, and thereby makes it possible to manufacture crack-free radially oriented magnets. Because these magnets are sintered bodies, however, uneven condensation can occur during sintering and the dimensional precision of the ring is poor. It is therefore necessary to grind the sintered body to the required dimensional precision before combining the sintered bodies with the center magnetic yoke.

As described above, adhesive methods are usually used with the above magnets. An integral molding method for molding the ring-shaped magnet and center magnetic yoke together in a body has been proposed in, for example, Japanese Patent Laid-Open Publication No. H4-115699. This method uses a die manufactured to the outside dimensions of the ring-shaped magnet, absorbing the pressure applied from inside the ring-shaped magnet with the die.

Figure 8:
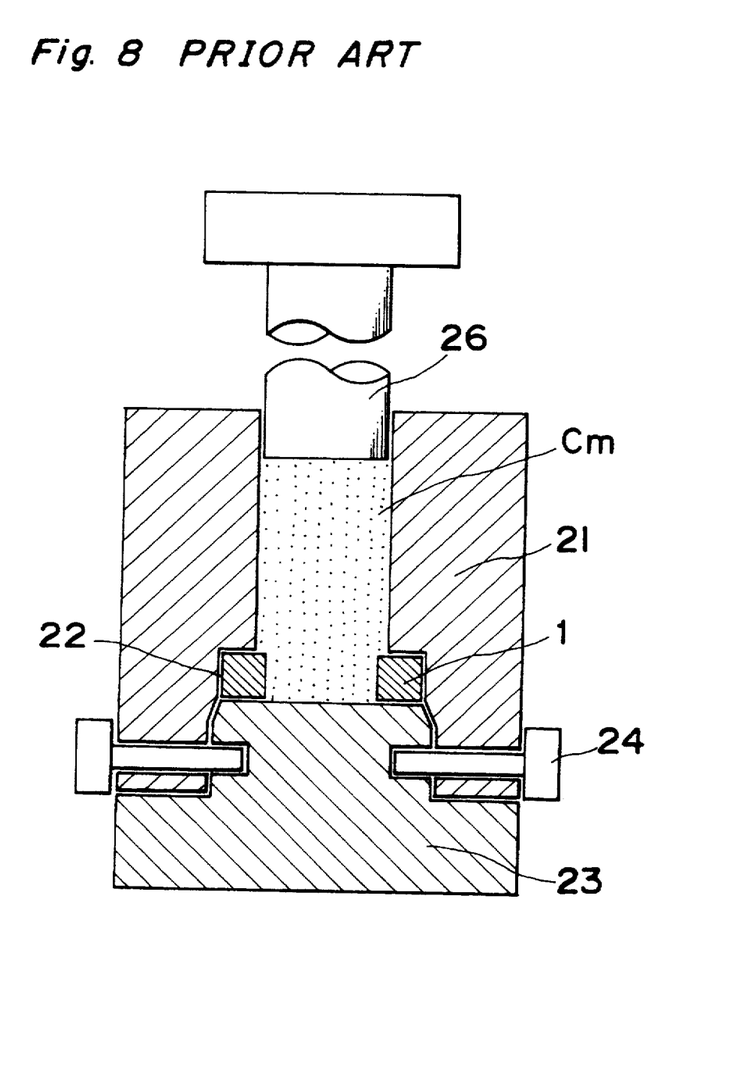
FIG. 8 is a cross-sectional view showing a conventional magnetic circuit component molding device.

A more specific application of this proposed integral molding method is described below with reference to FIG. 8. In FIG. 8, the ring-shaped magnet 1 is fit inside the magnet support 22 in the middle of the top die 21, and is supported by the bottom die 23. The top die 21 and bottom die 23 are connected with a pin 24 after the ring-shaped magnet 1 is loaded. In this method, the center magnetic yoke is formed with a mix or blend of magnetic powder and binder, i.e., a powder material Cm commonly called "compound." This powder material Cm is loaded inside the top die 21 and integrally molded to the ring-shaped magnet 1 by pressurized molding using a press 26. The pin 24 is then removed, the bottom die 23 is removed, the integral molding is pushed down and out of the top die 21 by the punch 26. Thus formed integral molding is, then, heat-cured to finish the magnetic circuit component of integrally molded ring-shaped magnet 1 and center magnetic yoke.

As described above, due to an uneven condensation during the sintering process, the dimensional precision of the ring-shaped magnet is poor with these conventional sintered magnets. This makes it necessary to grind the inside circumference of the ring-shaped magnet so that when the ring-shaped magnet is combined with the center magnetic yoke a gap creating magnetic resistance is not formed between the mating surfaces. Grinding an outside surface is relatively simple and low cost. Grinding the inside circumference surface, however, requires the frequent changing of small grindstones. This greatly increases the unit cost of the magnets, which is obviously a major problem. It is also difficult to assure dimensional precision in the outside circumference of the ring-shaped magnet and coaxial alignment of the ring-shaped magnet and center magnetic yoke axes when these are combined by adhesive, leading to the need to eliminate this adhesive process.

The manufacturing method that integrally molds the ring-shaped magnet with the inside center magnetic yoke can, however, eliminate this adhesive step. On the other hand, this method forms the inside diameter of the magnet support member of the top die to the outside diameter of the ring-shaped magnet, and the ring-shaped magnet is fit to the die. When pressure is applied to the magnetic yoke material with this method, pressure is applied to the ring-shaped magnet radially from the magnetic yoke material inside the ring-shaped magnet. When the pressure in the circumferential direction of the ring-shaped magnet created by this radial pressure is less than the tensile strength of the magnet, the ring-shaped magnet can withstand the pressure. Cracking occurs, however, when this pressure exceeds the tensile strength of the ring-shaped magnet. Cracking does not occur when the inside diameter of the top die magnet support member matches the outside diameter of the ring-shaped magnet because the pressure acting on the ring-shaped magnet is sustained by the top die 21.

When this method is applied to integrally mold ring-shaped magnets of a neodymium-iron-boron (Nd—Fe—B) sintered body, however, cracking occurs in 80–90% of the moldings. The outside circumference of the ring-shaped magnet is manufactured with a centerless process with an outside diameter dimensional precision of $\pm 20$ $\mu$m. The inside diameter dimension of the top die magnet support member is processed to match the maximum outside diameter of the ring-shaped magnets. As a result, a gap frequently occurs between the outside diameter of the ring-shaped magnet and the inside diameter of the support, and this gap is thought to permit cracking.

This gap is on the order of 0–40 $\mu$m. With a Nd—Fe—B sintered magnet, the tensile strength is a low 8.0 kgf/mm$^2$ with a Young's modulus of $1.6 \times 10^4$ kgf/mm$^2$.

The elongation at which destruction occurs due to tension is therefore a low $0.5 \times 10^{-3}$. With a 25 mm diameter ring-shaped magnet, cracking therefore occurs when the diameter increases only 12.5 μm.

In mass production, it is technologically difficult and very costly to further increase the processing precision, and we may conclude that preventing cracking with this integral molding method is difficult if not practically impossible. Development of an integral molding method with a high yield and low incidence of cracking is thus desirable.

Furthermore, an inside pressure acting in the radial direction to force the ring-shaped magnet 1 to the outside is increasingly generated while the compound Cm is compressed by the punch 26, resulting in the cracking of the magnet 1. To solve this problem, a conventional top die 21 comprised of plural die units each provided with a hydraulic cylinder is proposed. Each of these hydraulic cylinders is then driven simultaneously by means of a complex hydraulic control system outside the mold. This increases the space needed for the press mold is accordingly greater.

The object of the present invention is therefore to provide a production method and die mold for magnetic circuit components for integrally molding the ring-shaped magnet with the center magnetic yoke placed inside the ring-shaped magnet without causing cracks in the ring-shaped magnet.

SUMMARY OF THE INVENTION

The object of the present invention is therefore to provide a magnet circuit component molding device which solves these problems.

The present invention has been developed with a view to substantially solving the above described disadvantages and has for its essential object to provide an improved magnet circuit component molding device.

In order to achieve the aforementioned objective, a magnetic circuit component molding device for integrally molding a magnetic circuit component having a ring-shaped magnet and a center yoke, said center yoke being molded by a compound, said device comprises supporting means for supporting said ring-shaped magnet thereon; compressing means for compressing said compound against said ring-shaped magnet; a plurality of holder segments provided around said ring-shaped magnet; holder segment pressing means located adjacent each of said holder segments; and pressure means for pressing said compressing means and said holder segment pressing means toward said supporting means, whereby said compound is compressed toward a center of said ring-shaped magnet and, at the same time, said tapered surfaces press said holder segments toward a center of said ring-shaped magnet.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENT

Figure 1:
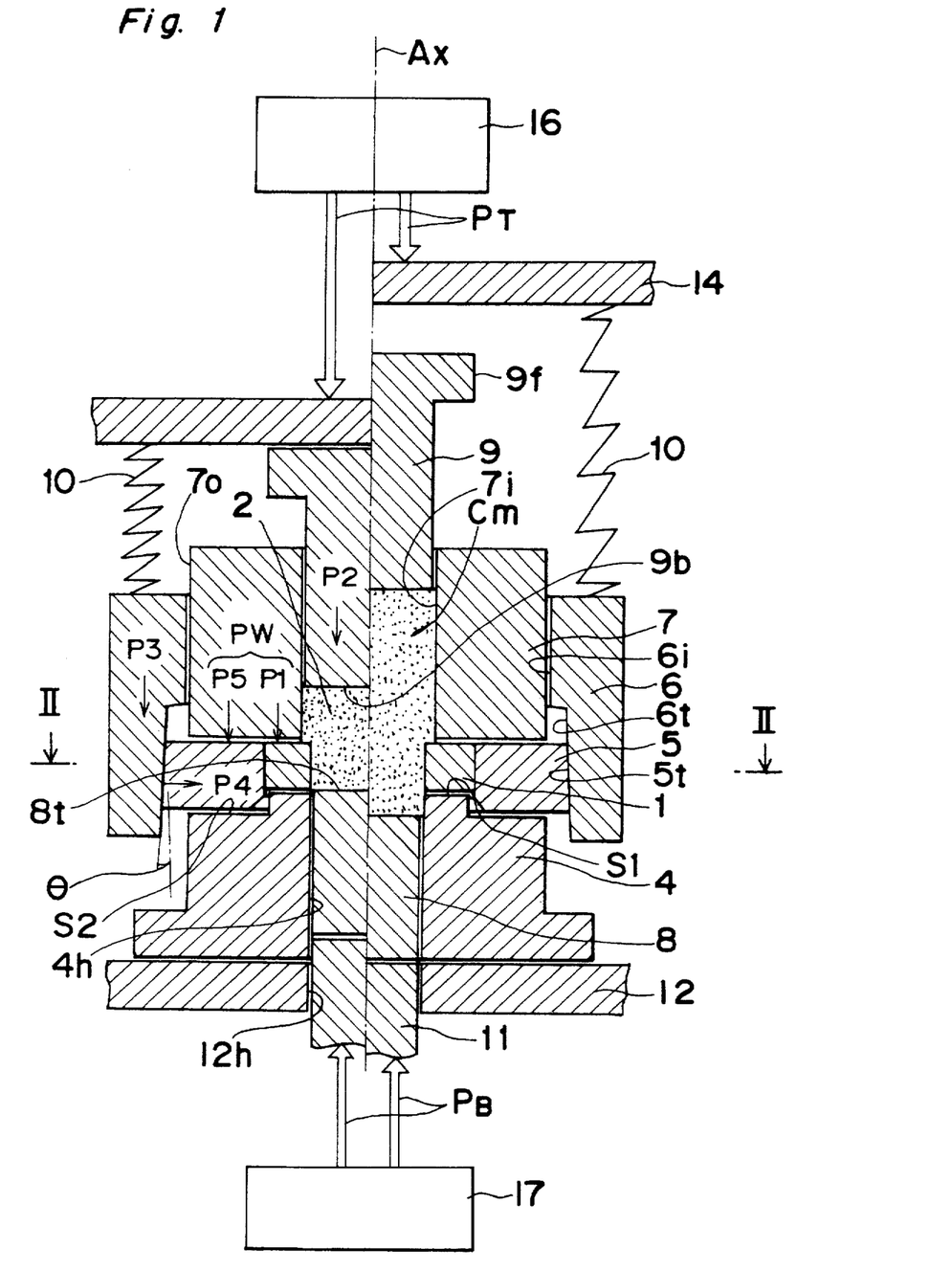
FIG. 1 is a cross-sectional view schematically showing a magnetic circuit component molding device according to the present invention.

Referring to FIG. 1, a magnetic circuit component molding device for molding a compound Cm and together with a ring-shaped magnet 1 according to an embodiment of the present invention is shown. The compound Cm is comprised of soft magnetic material, e.g. the magnetic powder and binder. Note that the right half of FIG. 1 with respect to an axis Ax shows the state before molding, and the left half shows the state after molding. The magnetic circuit component molding device, hereinafter referred to as "molding device", includes a bottom press unit 17 and a top press unit 16 which is located above the bottom press unit 17 preferably in alignment with the vertical axis Ax to oppose each other. The bottom press unit 17 has a bottom ram 11 which can reciprocate vertically with a predetermined pressure $P_B$. The top press unit 16 has a top ram 14 which can reciprocate vertically with a predetermined pressure $P_T$.

A table 12 having a through hole 12h preferably formed at its center is provided above the bottom press unit 17 such that the bottom ram 11 is slidably inserted in the through hole 12h. A bottom punch 8 formed in a cylindrical shape is provided on the top end of the bottom ram 11 so that bottom press unit 17 can vertically reciprocates the punch 8 along the axis Ax. The bottom punch 8 has a diameter corresponding to the inside diameter of the ring-shaped magnet 1. The main body portion of bottom punch 8 extrudes from the table 12 by a predetermined length.

A cylindrical shaped bottom die 4 having a through-hole 4h preferably formed at its center is provided around the bottom ram 11 extruding from the table 12 and is fixed to the table 12 by suitable fixing means such as bolts. The bottom die 4 has first and second stepped side walls around the outer circumference thereof to define first and second stepped stages S1 and S2, respectively, both formed on the top end side thereof. The first stage S1 is formed around the open end of throughhole 4h and the second stage S2 is formed around the first stage S1. The first stage S1 extrudes from the second stage S2 by a predetermined amount with respect to the axis Ax. It is to be noted that the ring-shaped magnet 1 is placed on the first stage S1 for molding operation, as shown in FIG. 1.

Figure 2:
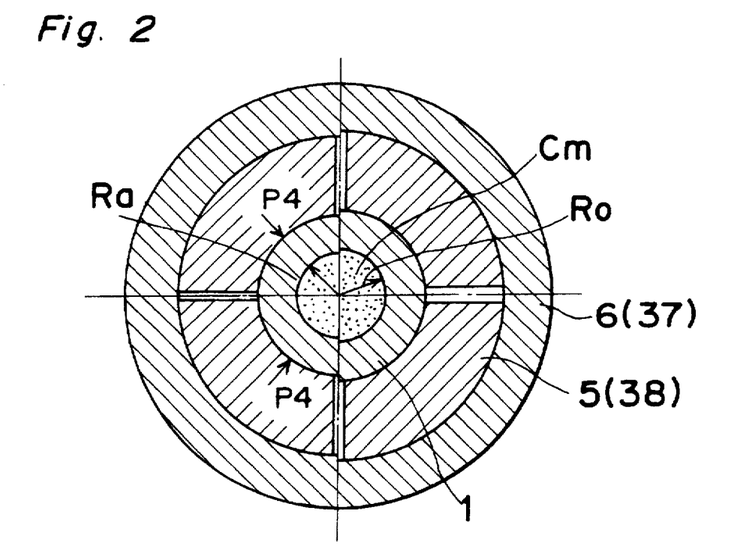
FIG. 2 is a cross-sectional view taking along with a line II—II in FIG. 1.

A holder unit 5 in a ring shaped configuration having an inside diameter equal to the average outside diameter of the ring-shaped magnet 1 is provided on the second stage S2 of the bottom die 4. The holder unit 5 has an outside circumference surface 5*t* which is tapered by a predetermined angle θ from the top side to the bottom side thereof. The holder unit 5 is preferably divided into a plural number of, preferably four, segments around the circumference, as best shown in FIG. 2, so that a radial movement of the holder unit 5 is possible. The holder unit 5 also extends in the axial direction by a predetermined length such that the top end surface of holder unit 5 will not extrude from the top end surface of the ring-shaped magnet 1 when the magnet is placed on the first stage S1.

A holder presser 6 in a cylindrically shaped configuration having an inside circumference surface 6*t* is provided over the holder unit 5. The inside circumference surface 6*t* is tapered by an angle corresponding to the angle θ from the middle to the bottom side thereof so that inside circumference surface 6*t* engages with the outside circumference surface 5*t* of the holder unit 5. The holder presser 6 further has a shoulder portion 6*i* formed inside extending from the inside circumference surface 6*t* to the top side ends thereof. The shoulder portion 6*i* has a predetermined diameter smaller than the smallest diameter of the tapered inside circumference surface 6*t*.

A number of springs 10 are tightly provided between the top ram 14 and the holder presser 6 so as to elastically transmit a portion of pressure PT of the top press unit 16 to the holder presser 6 when the top ram 14 is lowered.

Figure 3:
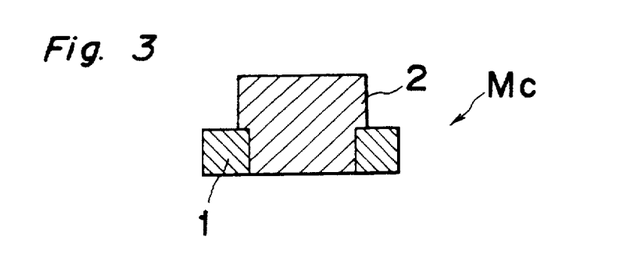
FIG. 3 is a cross-sectional view showing a magnetic circuit component formed by the magnetic circuit component molding device of FIG. 1.

A top die 7 in a cylindrical shaped configuration having outside and inside circumference surfaces 7*o* and 7*i* is provided inside the holder presser 6 with a predetermined clearance from the holder presser 6 such that the holder presser 6 can slide in the axial direction Ax. The outside circumference surface 7*o* is defined by a diameter greater than the outside diameter of the ring-shaped magnet 1. The inside circumference surface 7*i* is defined by a diameter greater than the inside diameter of the ring-shaped magnet 1 by a predetermined amount corresponding to the outside diameter of the center magnetic yoke 2 (FIG. 3). Therefore, when the weight PW of top die 7 is separately applied to the magnet 1 and holder 5. One is pressure P1 for vertically pressing the magnet 1 and the other is pressure P5 for vertically pressing the holder unit 5. It is to be noted that the molding chamber which is a space defined by the top end of bottom punch 8, inside circumference surface of magnet 1, the inside circumference surface 7*i* of the top die 7, and the bottom end of top punch 9 is supplied with metal compound Cm before molding operation.

A top punch 9 in cylindrical shaped configuration having a diameter corresponding to the desired diameter of the molded center magnetic yoke 2 is slidably provided inside the top die 7. The top punch 9 has a flange 9*f* around an upper portion of the circumference thereof. The flange 9*f* functions as a stopper for preventing the punch 9 from completely dropping down in and for determining the lowest position of the bottom end of the punch 9 by contacting to the top end surface of the top die 7. The compound Cm is press formed integrally with the ring-shaped magnet ring 1 into an inner configuration of molding chamber by the bottom end of top punch 9, and then a molded magnetic component Mc (best shown in FIG. 3) is manufactured. It is to be noted that the molding chamber is constructed by a molding die unit, assembled by top die 7, holder presser 6, holder unit 5, bottom die 4, top punch 9, and bottom punch 8 functions assembled, as shown in FIG. 1.

In operation, the top ram 14 is lowered with the pressure PT by the top press unit 16. First, the ram 14 begins to compress the springs 10. The pressure $P_T$ is elastically transferred through the spring 10 to drive the holder presser 6 down by a pressure P3, resulting in that a radial pressure P4 is generated at the tapered circumference surfaces 5*t* and 6*t* engaged to each other. It is to be noted that the radial pressure P4 is gradually increased as the top ram 14 moves down according to compression of the spring 10. The radial pressure P4 forces each segment of ring holder unit 5 to move in the radial direction toward the inside, thereby the radial pressure P4 to the sides of the ring-shaped magnet 1.

Second, the ram 14 contacts with the top end of punch 9 and then begins to press down the top punch 9 until the bottom end 9*b* thereof reaches its lowest position which can be determined based on the desirable length of magnetic yoke 2. At this lowest position, the top punch 9 can press the compound Cm with a molding pressure P2. Thus, the pressure $P_T$ of the top press unit 16 is divided in the molding pressure P2 applied to the top punch 9 and pressure P3 applied to the holder presser 6. Almost simultaneously, the bottom punch 8 is driven up by the bottom ram 11 until the top end surface 8*t* will preferably be aligned with the top surface of the stage S1 of the bottom die 4. It is to be noted that the distance between the top punch 9 at its lowest position and bottom punch 8 at its highest position defines the length of the press-formed magnetic yoke 2.

While the top punch 9 is lowering, the compound Cm is thus compressed from both top and bottom sides to form the center magnetic yoke 2, thus integrally molding the ring-shaped magnet 1 with the center magnetic yoke 2 to the state as shown on the left side of FIG. 1. As described above, the ring-shaped magnetic ring 1 and holder unit 5 are pressed against the first and second stages S1 and S2 of the bottom die 4 by pressure P1 and P5, respectively. Therefore, neither the ring-shaped magnet 1 nor holder unit 5 move in an axial direction even if any force other than the radial pressure P4 is applied to them during the molding operation.

After press molding of the center magnetic yoke 2, the top and bottom press units 16 and 17 pull back the top and bottom rams 14 and 11 to the respective starting positions. First, spring 10, bottom die 4, bottom punch 8 are released from the molding die unit, and then the remaining portion of the molding die unit containing the molded magnetic component Mc therein is inverted and is kept on the top punch 9, in which a pressure is applied to release the holder presser 6. The holder unit 5 is then removed, the top die 7 is pushed down, and the integral molding Mc of ring-shaped magnet 1 and center magnetic yoke 2 is removed.

Referring to FIG. 2, a cross sectional view of the magnetic circuit component molding device taking along with a line II—II in FIG. 1 is shown. Also in FIG. 2, the right half thereof shows the state before molding, and the left half shows the state after molding. The ring shaped-magnet 1 is compressed by the holder unit 5 with the radial pressure P4 so that the radius Ro thereof before molding is reduced to the radius Ra. The compression ratio of the ring-shaped magnet 1 is expressed by the equation of (Ro−Ra)/Ro. It is to be noted that reference number in parentheses in FIG. 2 shows the components of an alternation of the molding device which will be described with reference to FIG. 5.

Referring to FIG. 3, the integral molding Mc formed by molding operation described above is shown. The integral molding Mc is then heat-cured to finish the magnetic circuit component composed of integrally molded ring-shaped magnet 1 and center magnetic yoke 2.

Figure 4:
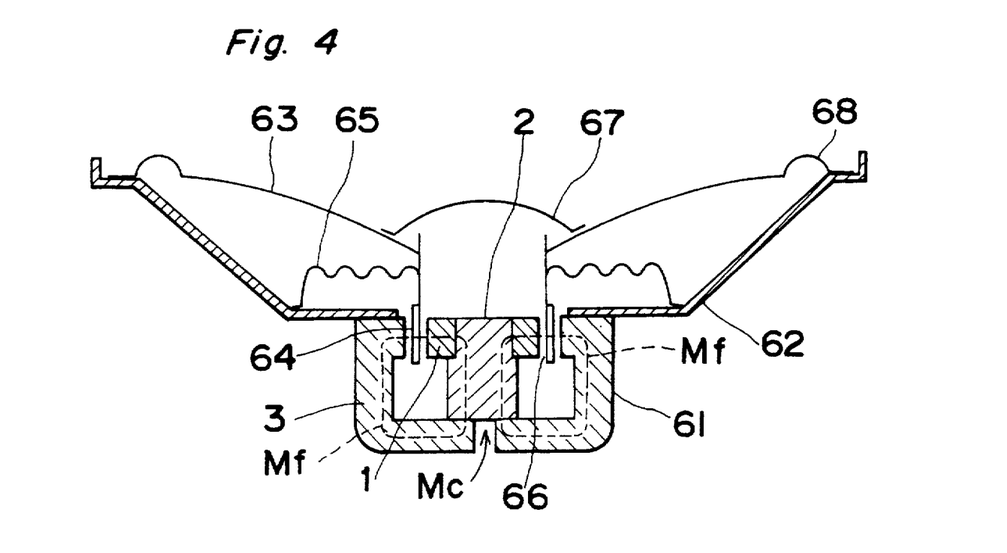
FIG. 4 is a cross-sectional view showing a loudspeaker equipped with a complete magnetic circuit component according to the present invention.

Referring to FIG. 4, a loud-speaker equipped with the magnetic circuit component formed by the molding device according to the present invention is shown. The loud-speaker has a frame 62, supporting a diaphragm 63, with a voice coil 64 attached to the apex of the diaphragm 63. The outer edge of diaphragm 63 is supported by a flexible edge 68. A magnetic circuit structure 61 is provided with the magnetic circuit component Mc at its center and built in generally E shaped configuration such that the ring-shaped magnet 1 is located on the frame side. The magnetic circuit component Mc functions as a central pole piece. The voice coil consists of several turns of small copper or aluminum wire, centered over a ring-shaped magnet 1. The voice-coil assembly is centered in a gap 66 between the ring shaped magnet 1 and an outer magnetic yoke 3 by means of damper 65. The current of the magnetic flux is indicated by the dotted lines Mf. The central pole piece Mc becomes, for example, the south pole of magnetic field and the outer edges of the magnetic circuit structure 61 are the north pole of the magnetic field.

Referring back to FIG. 1, the molding pressure P2 required by this method is described below. The following data is obtained from tests performed using the compound Cm mainly comprised of atomized iron powder and epoxy resin. In test, the compound Cm is molded as solid rectangles at variable molding pressures. A study of the relationship between molding pressure P2, molding density, and $4\pi I_s$ saturatin magnetization demonstrated there shows that there is a linearly proportional relationship between the density of the molding and the saturation magnetization. The relationship between molding pressure and the density of the molding is linearly proportional at low pressure levels. When the resin concentration increases, however, the saturation magnetization tends toward saturation. Based on this and the relationship between molding pressure and saturation magnetization, the molding pressure must be greater than 3 ton/cm$^2$ to obtain the magnetic characteristics enabling use as a magnetic yoke.

In integrally molding to manufacture a ring-shaped magnet 1 with a center magnetic yoke 2 therein, an inside pressure acting in the radial direction to force the ring-shaped magnet 1 to the outside is increasingly generated while the compound Cm is compressed by top and bottom punches 9 and 8 with pressures P2 and PB. This inside pressure may tend to crack the magnet 1 during the molding operation. However, the radial pressure P4 is applied to the outside circumference of the ring-shaped magnet 1 before the compression movement of punches 8 and 9 according to the present invention. Furthermore, since the radial pressure P4 is gradually increased according to the lowering of the top ram 14, as described above, it is possible to offset the inside pressure and prevent the magnet 1 from being cracked during molding operation.

The method of externally applying pressure to the outside circumference surface of the ring-shaped magnet 1 is described in further detail below.

As described above, applying pressure to the top of the holder presser 6 by means of the spring 10 drives the tapered member 6t of holder presser 6 against the tapered member 5t of ring holder unit 5 and pushes the ring holder unit 5 with the radial pressure P4 to the inside in the radial direction. The radial pressure P4 can be applied evenly to each section of the holder unit 5 so that the radial pressure P4 is applied to the outside circumference of the ring-shaped magnet 1.

Since a single press unit 16 can be used to apply the vertical pressure P$_T$, required by this method, for compressing the compound Cm and for clamping the ring-shaped magnet 1, and no additional device or space for pressing segments of holder unit 5 is required. Using the top ram 14 and spring 10 vertically pressing the holder presser 6, the radial pressure be easily applied from the sides of the ring-shaped magnet 1 slightly before press molding of the compound Cm begins.

Next, the radial pressure P4 is described. While the tapered member 6t of the holder presser 6 and tapered member 5t of holder unit 5 are in contact, the downward pressure P3 applied to the top of the holder presser 6 is amplified by the tapered members 5t and 6t, resulting in a high radial pressure P4 applied by the holder unit 5 to the ring-shaped magnet 1. The relationship between the total downward pressure P3 and the total radial pressure P4 was studied in simulations. When a taper angle $\theta$ is 2°, the radial pressure P4 has an pressure amplified to approximately eight times the vertical (downward) pressure P3, and is amplified approximately six times for a 5° taper angle. In other words, an approximately 8 ton pressure load can be applied radially by applying a 1 ton vertical load.

Figure 6:
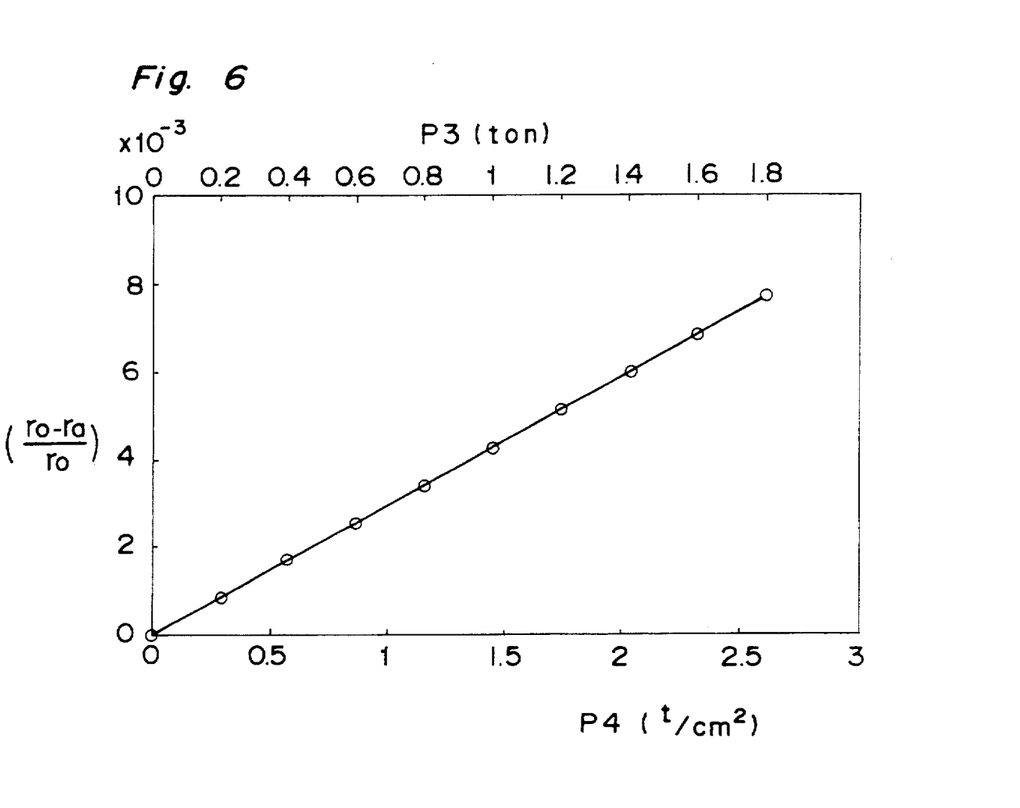
FIG. 6 is a graph showing a relationship between the contraction ratio of a ring-shaped magnet and the pressure radially applied thereto.

Referring to FIG. 6, a relationship between the contraction ratio of a ring-shaped magnet 1 and the radial pressure P4 (value per square centimeter) is shown. In the lower axis of the abscissa of this figure, is indicated the radial pressure P4 (value per square centimeter) corresponding to the downward pressure P3 indicated in the upper axis of the abscissa, when the taper angle $\theta$ is 2°. The contraction ratio of the ring-shaped magnet 1 expressed by (Ro−Ra)/Ro and is indicated in the axis of the ordinate. From this figure, it is apparent that the force of radial pressure P4 applied to the outer circumference surface of the ring-shaped magnet 1 can be determined regardless of the diameter of the magnet 1.

If one hydraulic cylinder is used to press each of four segments of holder unit 5 instead of the force amplification mechanism containing tapered members 5t and 6t of the present invention, each of hydraulic cylinders must generate a 2 ton force to obtain an 8 ton radial pressure which is equivalent to the radial pressure P4 which is obtained by the force amplification mechanism according to the present invention. Such a hydraulic cylinder requires a large diameter hydraulic ram. In other words, four units of costly and big hydraulic cylinders are required. Contrary to this, with the present invention, only a single unit of 1-ton downward pressure is sufficient.

While the pressure increase is higher with a small taper angle, this requires a longer down stroke. If the gap between the outer circumference surface of the ring-shaped magnet 1 inserted and inner circumference surface of the holder unit 5 is 0.5 mm, the holder presser 6 must travel 14.3 mm down. When molding with automated machinery, it may be impossible for compression molding with the top ram 14 and pressurization by the holder presser 6 to occur simultaneously. In this event a hydraulic cylinder driving holder presser 6 becomes necessary, but a small cylinder can be used because only low pressure is required.

When the taper angle θ is small, for example 2°, the tapered members 5t and 6t engage well and do not easily separate. When the compound Cm is compressed by the molding pressure P2, for example, of 4 ton/cm², the compressed compound Cm forces the inside circumference surface of the ring-shaped magnet 1 radially to the outside, but this pressure is approximately equal to the radial pressure P4 when downward pressure P3 is about 1 ton. Even though these pressures are roughly equal and mutually opposing in the radial direction of the ring-shaped magnet 1, when the ring-shaped magnet 1 is compressed to the inside by the radial pressure P4 immediately before compression of compound Cm, there is no change in compression of magnet 1 during the molding operation. This is because the holder presser 6 is engaged with the tapered members 5t and 6t and does not move, and the pressure of the compound Cm from the inside is sustained by the mechanical strength of the holder presser 6. This engagement of the tapered members 5t and 6t is held when the ring-shaped magnet 1 is compressed, and thus prevents cracking. To disengage the tapered members 5t and 6t, top and bottom rams 14 and 11 are returned to the respective starting position. The molding die set containing the molded magnet component Mc therein is inverted, and then is disassembled, as previously described with reference to FIG. 1.

The ring holder presser 6 can also be separated without inverting the molding dies (set) by applying upward pressure on the bottom of the holder presser 6 supported by either the top punch 9 or the top die 7. Preferably, the tapered members 5t and 6t are disengaged while a small pressure reduced after integrally molding is applied to the integrally molding of magnetic yoke materials Mc by the top punch 9 and bottom punch 8. This will prevent cracks in the neck of the integral molding Mc.

It is also noted that cracks may develop in the ring-shaped magnet 1 when the molded magnetic component Mc is removed from the molding dies (set). This cracking is because of the pressure from the center magnetic yoke 2. The external pressure P4 applied to the outside circumference of the ring-shaped magnet 1 enables the ring-shaped magnet 1 to withstand the internal pressure applied by compressed center magnetic yoke 2 during molding. The radial pressure P4 disappears when the molded magnetic component Mc is removed from the molding dies (set), however, and cracks may develop because the ring-shaped magnet 1 can no longer withstand the internal pressure. Since the axial molding pressure applied to the yoke 2 already disappeared, the internal pressure is caused by the inherent spring-back of the yoke 2 and appears when the molded magnetic component Mc is removed from molding dies.

The magnitude of this spring-back pressure is unknown because it cannot be measured. The expansion coefficient of a solid cylinder molded, by the molding device, of the iron powder and epoxy compound Cm was calculated to be $2.6 \times 10^{31}$ 3 by measuring the diameter of the solid cylinder after removing it from the molding dies and the inside diameter of the molding die to determine the difference in diameters. This coefficient was obtained using a 3 ton/cm² molding pressure P2. Studies demonstrated that the expansion coefficient rises as the molding pressure P2 rises, and varies with the concentration and type of resin component used in the compound Cm. It follows that by testing various combinations of molding pressure P2, resin component concentration and type, it should be possible to further reduce the incidence of cracking.

When a thermosetting organic resin is used as the binder, a thermosetting process is required after removing the molded magnetic component Mc from the molding dies. Because the expansion of the center magnetic yoke 2 is greater than that of the ring-shaped magnet 1 at this time, the pressure of expansion acting on the ring-shaped magnet 1 can cause the ring-shaped magnet 1 to crack. Using the atomized iron powder and epoxy resin compound Cm as above, this thermosetting expansion was approximately $1.2 \times 10^{-5}/°C$, close to the thermal expansion of pure iron. This value varies slightly according to the composition of the epoxy resin. Using a thermosetting temperature of 150° C. with a 125° C. difference from the room temperature, thermal expansion was $1.5 \times 10^{-3}$.

Thermoset cracking can be suppressed by keeping the tensile force of center magnetic yoke 2 expansion acting on the ring-shaped magnet 1 less than the tensile strength of the ring-shaped magnet 1. One way of achieving this is to compress the ring-shaped magnet 1 by the radial pressure P4 by a dimension approximately equal to the sum of the spring-back expansion and the thermoset expansion. When this is done, the ring-shaped magnet 1 expands to the original size when removed from the molding dies. The center magnetic yoke 2 inside the ring-shaped magnet 1 also expands because of spring-back, but this expansion as well as the normal thermoset expansion are absorbed by the expansion of the ring-shaped magnet 1. The effective force from the center magnetic yoke 2 pushing out on the ring-shaped magnet 1 is therefore reduced. As a result, the tensile force acting on the ring-shaped magnet 1 is less than the tensile strength of the ring-shaped magnet 1, and cracking does not occur in the ring-shaped magnet 1. Cracking can thus be suppressing by controlling the external pressure applied to the ring-shaped magnet 1.

The materials used for manufacturing molded magnetic component Mc by the molding device according to the present invention are described below. The ring-shaped magnet 1 is a neodymium-iron-boron sintered magnet. Because it is a ring-shaped sintered magnet, the dimensional precision of the rough sintered body is poor. The surface perpendicular to the axial direction is therefore ground flat and the outside circumference surface is centerless-ground to the specified tolerances for dimensional and circularity precision. The inside circumference surface thereof can be processed with inside circumference grinding, this is a costly process that, considering the final product cost, cannot be used. The inside circumference surface is therefore left in the sintered rough: dimensional precision is low, the inside circumference is uncentered and even elliptical in cases with a long to short diameter difference of 0.8 mm and uneven surface roughness. Generally, this kind of ring-shaped magnet 1 can not be used for magnetic component manufacturing without additional pre-precision machining or cracking. However, according to the present invention, the center magnetic yoke 2 can be integrally molded together with this ring-shaped magnet 1 to manufacture the magnetic component Mc.

The material of the integrally molded center magnetic yoke 2 is preferably a soft magnetic material that is relatively easy to shape by compression molding. A pure iron or Fe—Co material is preferred, but commonly used steel materials can also be used. When using such bulk materials, however, a relatively high molding pressure is needed to obtain sufficient adhesion between the magnetic yoke material and the inside circumference surface of the ring-shaped magnet 1. This makes it easier for cracks to develop, and thus requires that appropriate measures be taken to suppress cracking. When a compound soft magnetic material of magnetic powder and binder is used, however, the magnetic powder and binder are mixed or kneaded before crushing to form the compound Cm powder loaded into the mold. This fine powder can thus fill any voids caused by the surface roughness of the inside circumference surface of the ring-shaped magnet 1. The density of the magnetic yoke material thus rises when pressure is applied, and pressure is applied uniformly to the complete inside circumference surface of the ring-shaped magnet 1, not just the high points caused by surface roughness. A lower molding pressure can therefore be used when compared with the pressure required by bulk materials, making it easier to prevent cracking. This compound is therefore ideal for integral moldings.

Considering cost, supply, and magnetic characteristics, iron powder that is mass produced using atomization methods is the best magnetic powder material. Atomized iron powder typically has a maximum grain diameter of 250 μm while approximately 30% of the yield has a grain diameter of 49 μm or smaller. The minimum grain diameter can be concluded to be 20 μm since only about 1% of the total powder volume passes through a 20 μm mesh sieve. The average grain diameter of atomized iron powder is a relatively large 100-150 μm. Atomized iron powder is also resistant to oxidation in air, is easy to handle because there is no danger of spontaneous combustion, and is easy to mold and condense with little pressure. The composition of the atomized iron powder manufactured in the largest quantities is close to pure iron and has a saturation magnetization characteristic of 2.1 T (tesla). This is close to the 2.2-2.4 T of Fe—Co alloy, the alloy with the highest saturation magnetization characteristic of currently usable alloys. Overall, the magnetic characteristics of this compound Cm are very good.

The preferred binder is an organic thermosetting resin that can be molded at room temperature; epoxy resins are best. Epoxy resins consist of a chief material and a hardener. The curing start temperature and the time to usability can be controlled by the type of hardener used, making it possible to rationalize production conditions. Various additives are also available, and the properties of the resin can therefore be modified to obtain the desired product characteristics. The disadvantage of using a thermosetting organic resin is that the integral molding is soft and brittle after molding until the thermosetting process is completed, and care is therefore required in handling.

The mechanical strength of the molded magnetic component Mc removed from the molding dies is sufficient when using a thermoplastic organic resin, but molding must be completed at a high temperature exceeding the melting point of the resin, and the molding must then be cooled to near room temperature after molding. When the compound is prepared by kneading, it is also necessary to use at a temperature exceeding the melting point of the resin and then crush the kneaded blend to powder form again. This is not required when resin powder is simply mixed with the other compound Mc constituents. The additional need for heating and cooling cycles in the molding process accordingly increases the molding time and thus lowers productivity.

Figure 7:
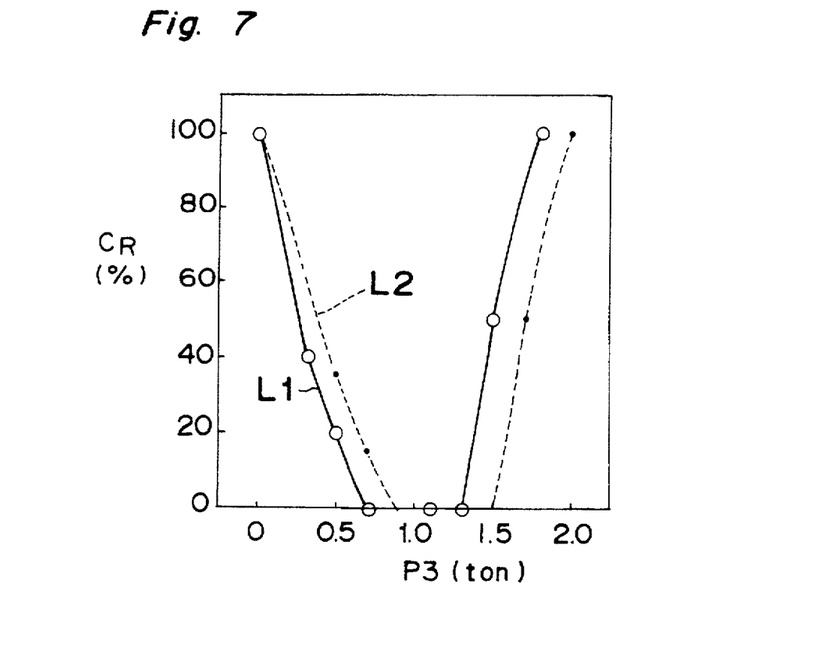
FIG. 7 is a graph showing a relationship between cracking ratio of ring-shaped magnet and the pressure vertically applied to the top die of FIG. 1.

Referring to FIG. 7, relationships between cracking in the ring-shaped magnet 1 of the molded magnetic component Mc and the downward pressure P3 with different molding pressure P2 is shown. These relationships are obtained from the experiments performed using the molding device according to the present invention under the following conditions.

The ring-shaped magnet 1 was a Nd—Fe—B sintered magnet with the faces perpendicular to the axis ground flat and the outside circumference surface centerless-ground to an outside diameter of 25 mm, inside diameter of approximately 18 mm, and height of 7 mm. The compound Cm was prepared by mixing, kneading, and crushing 100 parts atomized iron powder with 1 part epoxy resin (chief material and hardener). The diameter of the part of the center magnetic yoke 2 under the ring-shaped magnet 1 is 19 mm; the top die 7 inside diameter and the top punch 9 diameter are manufactured to enable molding to this dimension. The spring 10 has a maximum load capacity of 2.0 tons. Experiments were performed using the molding pressures P2 having different load of 3 ton/cm$^2$ and 4 ton/cm$^2$ when the taper angle $\theta$ of the tapered members 5t and 6t is 2°.

Spring 10 compression is linearly proportional to the pressure applied to the spring 10. The pressure applied to the outside circumference of the ring-shaped magnet 1 can be varied by changing the spring 10 compression. The presence of cracks in the ring-shaped magnet 1 removed from the forming dies was therefore studied using a stereo microscope under variable spring pressure (i.e., this pressure is proportional to the pressure applied to the outside circumference of the ring-shaped magnet 1) and molding pressure conditions.

A line L1 in FIG. 7 shows the result of cracking in the magnet 1 when the molding pressure P2 is 3 ton/cm$^2$. A cracking sound could be heard with a 3 ton/cm$^2$ molding pressure and no spring pressure, meaning that the downward pressure P3 is zero. Cracks were observed in all of the plural sample moldings Mc removed from the molding dies. This cracking sound was heard periodically during molding up to an approximately 0.3 ton spring pressure P3, but disappeared at approximately 0.7 ton. Cracks were confirmed by visual inspection in some of the moldings Mc even in the case when no cracking sound is heard. These cracks were attributed to spring-back after removal of the pressure on the outside circumference of the ring-shaped magnet 1.

Cracks also developed during the thermosetting process in some of the crack-free moldings. This is attributed to differences in the thermal expansion coefficients during the thermosetting process. Cracks did not develop even after thermosetting when formed with a 0.7-1.3 ton spring pressure. Cracks began to appear again when the spring pressure was further increased, but the crack morphology differed from that of the cracks at a low spring pressure. These cracks were attributed to destruction of the ring-shaped magnet 1 due to excessive pressure on the outside circumference of the ring-shaped magnet 1. We may therefore conclude that the safe spring pressure for a 3 ton/cm$^2$ molding pressure is 0.7-1.3 ton, and is preferably in the range 0.8-1.2 ton.

A line L2 in FIG. 7 shows the result of cracking in the magnet 1 when the molding pressure P2 is 4 ton/cm$^2$. A similar trend to that in the case of line L1 was observed in this case, but the spring pressure tended to be about 0.2 ton higher. This is because the pressure of the magnetic yoke material pushing radially out on the ring-shaped magnet 1 increases as the molding pressure rises, and the external pressure on the outside circumference must increase to withstand the internal pressure. We therefore concluded that the safe spring pressure for a 4 ton/cm$^2$ molding pressure is 0.9-1.5 ton, and is preferably in the range 1.0-1.4 ton.

In these experiments, the relationships with respect to the downward pressure P3 are studied, however, similar relationships will be observed with respect to the radial pressure P4, because the radial pressure P4 substantially equivalent to a pressure amplified to predetermined times of the downward (vertical spring) pressure P3.

From the above, it is apparent that the optimum radial pressure P4 (downward pressure P3) varies according to the molding pressure P2. In the radial direction of the ring-shaped magnet 1, the inside radial pressure applied from the inside of magnetic yoke material and the radial pressure P4 (vertical spring pressure P3) act as a compressive force on the ring-shaped magnet 1. Because the difference in the two pressure levels functions as the pressure causing cracks in the ring-shaped magnet 1, a higher internal pressure forces the ring-shaped magnet 1 to the outside and cracks occur. But if the outside pressure is higher, the ring-shaped magnet 1 is compressed to the inside and cracks occur again. Because the mechanical strength of Nd—Fe—B sintered magnets is greater than that of other sintered magnets, the intrinsic material strength to both tension and compression makes it possible to withstand a pressure difference equal to this material strength, and cracking does not occur.

Next, the experiment results of the case when the compound Cm prepared by mixing an atomized FeCo alloy powder with a Nylon 6 fine powder at a rate of one hundred to one is described. The atomized FeCo alloy powder functions as magnetic power, and Nylon 6 fine powder which is thermoplastic resin functions as the binder.

After inserting the ring-shaped magnet 1 and assembling the molding dies, a heater was installed outside the ring holder presser 6 to heat the complete entire of molding dies to 250° C. Sheet insulation was inserted between the fixed table 12 and bottom die 4, between the bottom ram 11 and bottom punch 8, and between the top ram 14 and top punch 9 to prevent heat loss for a more uniform heat distribution through the molding dies. The compound Cm was then loaded, the top punch 9 inserted, and the spring 10 compressed to pressurize the ring-shaped magnet 1 from the outside circumference. The compound Cm was then heated to approximately 250° C. over a period of several minutes without applying pressure by the top punch 9.

Pressure was then applied to the top punch 9 and bottom punch 8 to compress the compound Cm and form the center magnetic yoke 2, resulting in the integral molding of ring-shaped magnet 1 and center magnetic yoke 2. The molding pressure P2 was a maximum 4 ton/cm$^2$ with a spring pressure of 1.3 ton produced by spring compression. The molding pressure was then reduced and the molding cooled while maintaining a certain spring pressure. When the molding cooled to room temperature, all pressure was released and the integral molding was removed from the mold. Observation by stereo microscope confirmed no cracks in the ring-shaped magnet 1.

Cracking does not occur with this compound Cm if cracking is suppressed during molding because the center magnetic yoke 2 is integrally molded with the ring-shaped magnet 1 at a high temperature and contracts through cooling to room temperature. Little or no pressure is therefore applied by the center magnetic yoke 2 to the ring-shaped magnet 1, and post-molding thermosetting is not required.

The present invention thus achieves a manufacturing method for low cost magnetic circuit components by applying pressure radially to the ring-shaped magnet from the outside circumference thereof while compression molding in the axial direction the magnetic yoke material placed inside the ring-shaped magnet, thus bonding a ring-shaped magnet and center magnetic yoke with no gap between and without creating any cracks in the ring-shaped magnet, and successfully eliminating the adhesion process used in conventional methods.

Figure 5:
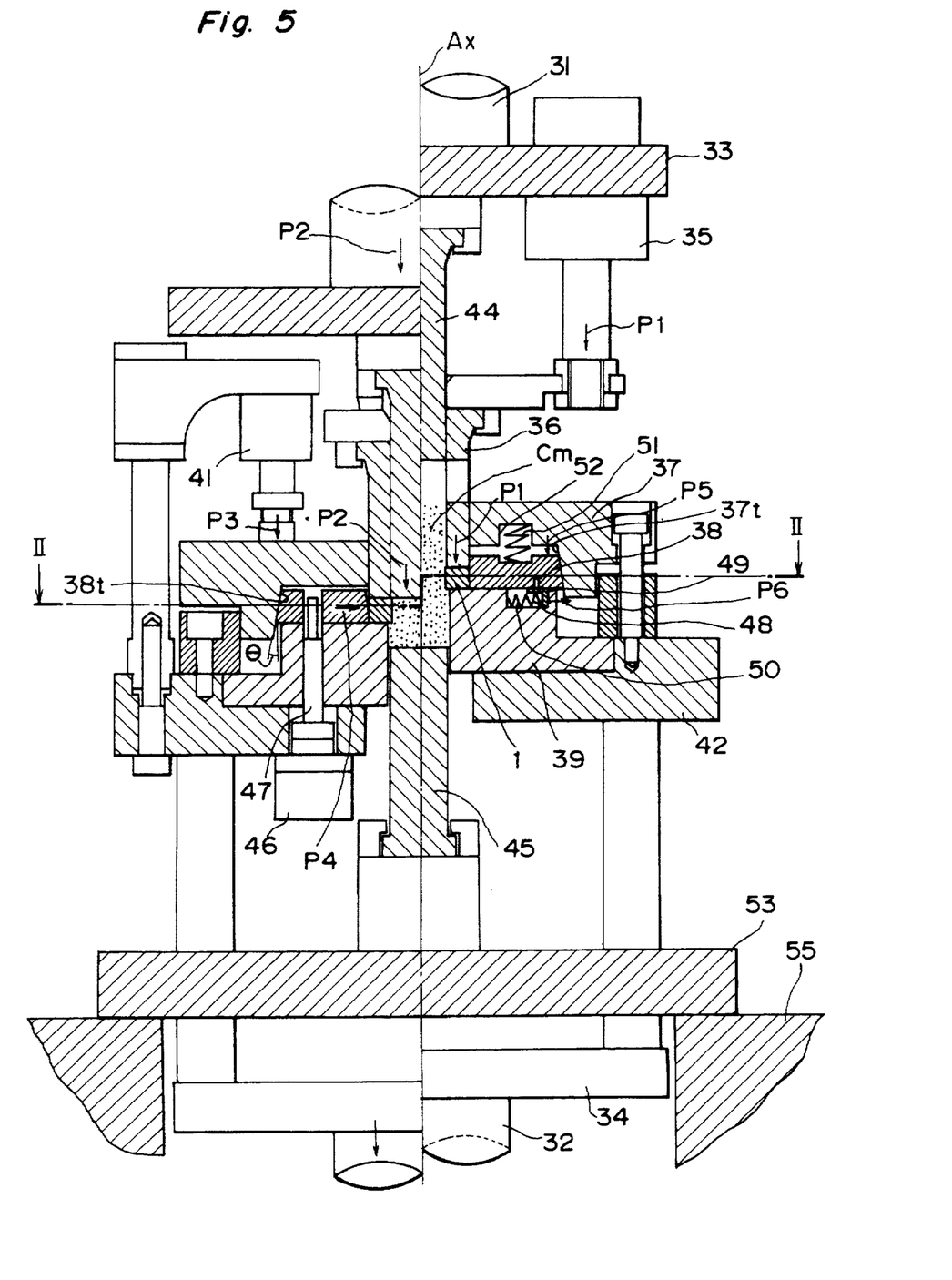
FIG. 5 is a cross-sectional view showing an alternative embodiment of magnetic circuit component molding device according to the present invention.

Referring to FIG. 5, an alternative embodiment of the magnetic circuit component molding device (molding device) according the present invention is shown. In this embodiment, the molding device has a construction very similar to that of molding device of FIG. 1. The molding device includes a bottom hydraulic press unit (not shown) having a bottom cylinder 32. A top press unit (not shown) having a top cylinder 31 which can reciprocate vertically with a pressure P2 is located above the bottom hydraulic press unit in alignment with the vertical axis Ax.

A bottom plate 53 having through holes formed therein is provided above the bottom cylinder 32, and is fixed to a base 55 of the molding device. A bottom ram 34 in a generally U shaped configuration having two vertical arm portions is connected to the bottom cylinder 32 and two vertical arm portions thereof are slidably inserted in through holes of the bottom plate 53, so that the bottom ram 34 can be reciprocated by the bottom cylinder 32. The bottom plate 53 is provided with a bottom punch 45 in a position aligned in the axis Ax. The bottom punch 45 has a diameter corresponding to the diameter of the yoke 2 of the magnetic component Mc.

A die table 42 formed with a through hole at its center is connected to the free ends of arm portions of the ram 34 such that the bottom punch 45 is located in the through hole thereof with a suitable clearance. The die table 42 is provided with a small hydraulic cylinder 41 which can reciprocate in the axial direction with the downward pressure P3 thereabove. The die table 42 has a recess formed on the top surface around the through hole thereof. In this recess, a bottom die 39 having a center through hole is provided as the bottom punch 45 can be located in the center through hole thereof. The bottom die 39 has recesses 50 formed in the top surface thereof for receiving springs 48 arranged in the radial direction. The spring 48 is provided with a hook 49 at the distal end thereof with respect to the axis Ax. The die table 42 is further provided with a small hydraulic cylinder 46 having a removing punch 47 which can vertically reciprocate inside through-holes formed in the bottom die 39 on its distal circumference.

The ring-shaped magnet 1 is placed on the bottom die 39 with its center aligned in the axis Ax. A holder unit 38 of plural segments having tapered outside circumference surface 38$t$ are placed on the bottom die 39 and around the magnet 1, and each of whose segments is connected to the hook 49 of the vertical spring 50.

Then, the holder unit 38 is biased outward in the radial direction by the hook 49. The holder unit 38 also has a through-hole for reciprocating the removing punch 47 therein.

A holder presser 37 in a cylindrically shaped configuration having a tapered inside circumference surface 37t is connected to the die table 42 in such a manner that the holder presser 37 can move in axial direction with the holder unit 38 accommodated therein. The holder presser 37 has recesses formed in the bottom surface thereof for receiving springs 51 which can apply a pressure P5 to the holder unit 38 in the axial direction. By this pressure P5, the holder unit 38 is clamped at the bottom die 39 and does not move up during the molding operation.

A forming punch 44 in cylindrical shaped configuration having a diameter corresponding to an inside diameter of the ring-shaped magnet 1 is provided on the bottom of the top ram 33 along with the axis Ax. Around the forming punch 44, a tubular punch 36 having inside and outside diameters corresponding to those of the ring-shaped magnet 1 is provided. The tubular pouch 36 is connected to an pneumatic cylinder 35 provided in the top ram 33 and can be reciprocated in the axial direction by a clamping pressure P1. The tubular punch 36 has a slot 36S opened in the side wall thereof. The slot 36S is located at a position near the top end.

The molding operation by the molding device according to this alternation is described with reference to FIG. 5, in which the right half shows the state before molding, and the left half shows the state after molding.

First, the components of molding device are set at starting positions. The top press unit actuates the top cylinder 31 to pull up the top ram 33 together with the forming punch 44 and pneumatic cylinder 35 until reaching the starting position. Then, the bottom press unit actuates the cylinder 32 to lift up the bottom ram 34 together with the die table 42 and forming dies 37, 38, and 39 until reaching the starting position. Next, the pneumatic cylinder 35 actuates to pull up the tubular punch 36 such that the bottom edge of the tubular cylinder 36 is located at the level higher than the top surface of the holder presser 37.

Second, the ring-shaped magnet 1 is supplied into the molding device. The ring-shaped magnet 1 is placed on the bottom die 39 and is located in the center hole of the holder unit 38. The pneumatic cylinder 35 actuates the tubular punch 36 such that the tubular punch 36 goes down through the center holes of holder presser 37 and holder unit 38, and presses the ring-shaped magnet 1 against the bottom die 39 with the clamping pressure P1. At this time, the lower edge portion of the slot 36S is aligned with the top surface of the holder pressure 37. A small pressure of, for example, about 10 Kg/cm² pressure is enough for the clamping pressure P1 to clamp the magnet 1 during the molding operation. It is to be noted that the clamping pressure P1 is supported by the bottom ram 34 through the bottom die 39 and die table 42. Next, the compound Cm is supplied into the forming cavity defined by tubular punch 36, ring-shaped magnet 1, bottom die 39, and bottom punch 45 through the slot 36S;

Third, the radial pressure P4 is applied to the outer circumference surface of the ring-shaped magnet 1. The small hydraulic cylinder 41 actuates to press the holder presser 37 downward with the downward pressure P3. The downward pressure P3 is amplified by the tapered members 37t and 38t and then the radial pressure P4 is applied to outer circumference surface of the ring-shaped magnet 1. According to the radial pressure P4, the magnet 1 gets compressed radially.

Fourth, the compound Cm is compressed to integrally mold with the ring-shaped magnet 1. The top hydraulic press unit actuates the top ram 33 to move downward such that the forming punch 44 slide down inside the tubular punch 36. By lowering of the forming punch 44, the compound Cm in the forming chamber is compressed by the bottom end surface of the forming punch 44. As the compound Cm is thus compressed, a downward force is generated and applied to the inside circumference surfaces of magnet 1 and bottom die 39, causing the forming dies to move down. As a result of this movement of the forming dies, the bottom punch 45 can compress the compound Cm further as if the bottom punch 45 moves up. It is to be noted that the axial length of the molded magnetic component Mc, the length of yoke 2 defined between the top and bottom punches 44 and 45, is determined by the position of bottom punch 45 with respect to the molding dies.

The tubular punch 36 continually clamps the ring magnet 1 on the bottom die 39 with the clamping pressure P1 constantly applied by the pneumatic cylinder 35, and the downward force coming from the compressed compound Cm. In this molding device, the top punch 44 and tubular punch 36 are constructed to have suitable stopper means engagable to each other to enable to operate in a way described below. The top punch 44 goes down independently from the tubular punch 36 until the bottom end surfaces thereof 36 and 44 become the same level where both stoppers engaged. As those stoppers, for example, lower end edge of the top flange part of forming punch 44 and upper end edge of the top flange part of tubular punch 36 can be employed, as shown in FIG. 5. After engagement of those stoppers, the forming punch 44 and tubular punch 36 integrally go down.

Since the axial length of the molded magnetic component Mc is determined relative to the top end of bottom punch 45, the top hydraulic press unit will stop its lowering motion when the distance between forming punch 44 and bottom punch 45 reaches the desirable length of the molded yoke 2. This can be performed by controlling the stroke of press unit with the a method wellknown to the personals skilled in the field of press working. It is preferable that the bottom end of forming punch 44 reaches the same level as the bottom end surface of tubular punch 36 at the same time when the forming dies stops the lowing motion. Thus, the molded magnet component Mc (2) having an even density is obtained and is in the inverted style when compared with the molding device of FIG. 1.

Fifth, the molded magnet component Mc is removed from the molding device. The top press unit reduces the pressure applied to the punches 44 and 45. The small hydraulic cylinder 41 pulls up to make the holder presser 37 free from the downward pressure P3. However, the holder pressure 37 and holder units 38 can not be separated easily due to the engagement of the both of tapered members 37t and 38t. To solve this engagement, the removing punch 47 lifts up to press up the lower surface of the holder presser 37. As a result of releasing the tight engagement between tapered members 37t and 38t, the radial pressure P4 is disappeared. As the holder presser 37 moves up, the holder unit segments 37 moves outwardly in the radial direction by the radial spring 48 so that the ring-shaped magnet 1 is released from the holder units 38.

Next, the bottom press unit actuates the bottom ram 34 to pull down the die table 42 together with the molding dies 37, 38, and 39 so that the molded magnet component Mc is left on the bottom punch 45 whose top end surface is aligned in the same level of top end surface of the holder presser 37. Then, the upper press unit actuates the top cylinder 31 to pull up the forming punch 44 and tubular punch 36 from the molded magnetic component Mc. The completed molded magnet component Mc is taken out from the molding device.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A magnetic circuit component molding device for integrally molding a magnetic circuit component having a ring-shaped magnet and a center yoke, said center yoke being molded by a compound, said device comprising:
    supporting means for supporting said ring-shaped magnet thereon;
    compressing means for compressing said compound and expanding said compound radially outward against said ring-shaped magnet;
    a plurality of holder segments surrounding said ring-shaped magnet and movable radially inward to radially compress said ring-shaped magnet;
    holder segment pressing means located adjacent each of said holder segments; and
    pressure means acting on said compressing means and said holder segment pressing means for simultaneously compressing said compound and expanding said compound radially outward against said ring-shaped magnet and pressing said holder segments toward a center of said ring-shaped magnet.

2. A magnetic circuit component molding device as claimed in claim 1, wherein said ring-shaped magnet is a neodymium-iron-boron sintered magnet.

3. A magnetic circuit component molding device as claimed in claim 1, wherein said compound essentially comprises metal powder and binder wherein said metal powder comprises a soft magnetic material.

4. A magnetic circuit component molding device as claimed in claim 3, wherein said magnetic powder is comprised of iron powder and said binder is comprised of an organic resin.

5. Apparatus for integrally molding a magnetic circuit component having a ring-shaped magnet and a center yoke molded from a compound, said apparatus comprising:
    means upon which the ring-shaped magnet is positioned for supporting the ring-shaped magnet;
    compound compressing means for compressing the compound axially and expanding the compound radially outward against the ring-shaped magnet;
    magnet compressing means for compressing said ring-shaped magnet radially inward against the compound; and
    drive means acting simultaneously on said compound compressing means and said magnet compressing means for simultaneously compressing the compound axially and expanding the compound radially outward against the ring-shaped magnet and compressing the ring-shaped magnet radially inward against the compound.

* * * * *

UNITED STATES PATENT AND TRADEMARK OFFICE
CERTIFICATE OF CORRECTION

PATENT NO.   : 5,364,253
DATED        : November 15, 1994
INVENTOR(S)  : Kojima et al.

It is certified that error appears in the above-identified patent and that said Letters Patent is hereby corrected as shown below:

Column 18, line 12, after the word "comprises" insert -- a soft magnetic --.

Column 18, lines 12-13, delete "wherein said metal powder comprises a soft magnetic material".

Signed and Sealed this

Fourteenth Day of March, 1995

Attest:

BRUCE LEHMAN

Attesting Officer          Commissioner of Patents and Trademarks